REACTIVE PHTHALOCYANINE DYESTUFFS CONTAINING A FLUOROCHLOROPYRIMIDINYL GROUP

Inventors: Karl H. Schündehütte; Manfred Groll, both of Leverkusen; Josef W. Stawitz, Odenthal, all of Fed. Rep. of Germany Assignee: Bayer Aktiengesellschaft, Leverkusen, Fed. Rep. of Germany Appl. No.: 431,969

Filed: Nov. 6, 1989

Foreign Application Priority Data

Nov. 29, 1988 [DE] Fed. Rep. of Germany ....... 3840164

Int. Cl.$^5$ .................. C09B 62/26; D06P 1/382
U.S. Cl. .................. 540/125; 544/326; 544/334
Field of Search .................. 540/125

References Cited

U.S. PATENT DOCUMENTS

| | | | |
|---|---|---|---|
| 3,105,070 | 9/1963 | Bitterli | 540/125 |
| 3,127,389 | 3/1964 | Seftz | 540/125 X |
| 3,247,194 | 4/1966 | Benz et al. | 540/125 |
| 3,336,283 | 8/1967 | Weissauer | 540/125 X |
| 3,752,801 | 8/1973 | Hoelzle et al. | 540/125 X |
| 3,989,692 | 11/1976 | Jager et al. | 540/125 |
| 4,007,164 | 2/1977 | Bien et al. | 534/627 |
| 4,052,386 | 10/1977 | Bien et al. | 540/125 |
| 4,246,174 | 1/1981 | Groll | 540/125 |
| 4,280,956 | 7/1981 | Schreiner et al. | 540/125 |
| 4,602,915 | 7/1986 | Wolff et al. | 8/527 |

FOREIGN PATENT DOCUMENTS

| | | | |
|---|---|---|---|
| 1165661 | 10/1969 | United Kingdom | 534/627 |
| 1208553 | 10/1970 | United Kingdom | 540/125 |

Primary Examiner—Mary C. Lee
Assistant Examiner—Fiona T. Powers
Attorney, Agent, or Firm—Sprung Horn Kramer & Woods

[57] ABSTRACT

Novel reactive dyestuffs of the formula

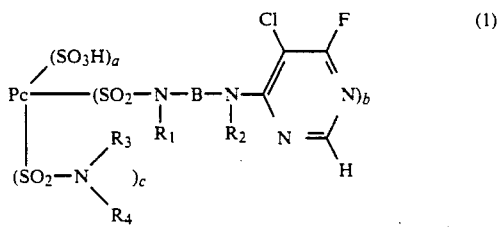

wherein
Pc = radical of a Cu- or Ni-phthalocyanine,
$R_1$, $R_2$ = H, $C_1$-$C_4$-alkyl optionally substituted with —OH, —COOH, —OSO$_3$H or —SO$_3$H, or together $C_2$-alkylene,
B = $C_2$-$C_6$-alkylene or phenylene optionally substituted by $C_1$-$C_4$-alkyl, $C_1$-$C_4$-alkoxy, halogen, nitro, cyano, COOH, SO$_3$H, carboxanide, sulphonamide, $C_1$-$C_4$-alkylcarbonylamino or —NHCONH$_2$,
$R_3$, $R_4$ = H, $C_1$-$C_4$-alkyl optionally substituted with OH, —COOH, —OSO$_3$H or —SO$_3$H, or optionally sulphur- or carboxyl-substituted phenyl, or together $C_2$-alkylene,
a = 1.0 to 2.7,
b = 0.8 to 1.2, and
c = 0.5 to 1.5, where a+b+c = 3 to 4.

4 Claims, No Drawings

REACTIVE PHTHALOCYANINE DYESTUFFS CONTAINING A FLUOROCHLOROPYRIMIDINYL GROUP

The present invention relates to reactive dyestuffs of the formula

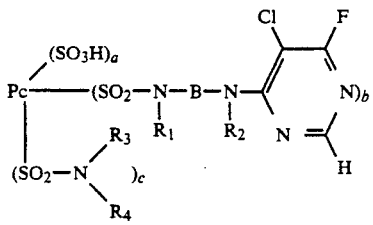

wherein

Pc = radical of a Cu- or Ni-phthalocyanine, $R_1$, $R_2$ = H, optionally substituted $C_1$-$C_4$-alkyl or together optionally substituted $C_2$-alkylene, B = optionally substituted aliphatic radical or optionally substituted phenylene, $R_3$, $R_4$ = H, optionally substituted aliphatic or aromatic radical, a = 1.0 to 2.7, preferably 1.8 to 2.7, b = 0.8 to 1.2, c = 0.5 to 1.5, preferably 0.5 to 1.0, where a+b+c = 3 to 4.

The radicals $R_1$, $R_2$ on the one hand, and $R_3$, $R_4$ on the other, have the stated meaning independently of one another.

Each of the sulpho or sulphonamide groups is bonded to a different benzene ring of the phthalocyanine in the 3- or 4-position.

Suitable radicals $R_1$ and $R_2$ besides H also include for example unsubstituted or OH—, COOH—, OSO$_3$H— or SO$_3$H-substituted $C_1$-$C_4$-alkyl, such as methyl, ethyl, propyl, β-hydroxyethyl, γ-hydroxypropyl, β-carboxyethyl, β-sulphoethyl.

Suitable radicals B are in particular phenylene, optionally substituted by $C_1$-$C_4$-alkyl, $C_1$-$C_4$-alkoxy, halogen, in particular Cl, nitro, cyano, COOH, SO$_3$H, carboxamide, sulphonamide, acylamino, in particular $C_1$-$C_4$-alkylcarbonylamino or —NHCONH$_2$ or else $C_2$-$C_6$-alkylene.

Specific examples are the following radicals B: 1,2-phenylene, 1,3-phenylene, 1,4-phenylene, 3-methyl-1,4-phenylene, 2-methyl-1,4-phenylene, 2-methyl-5-chloro-1,4-phenylene, 4-methoxy-1,3-phenylene, 3-methoxy-1,4-phenylene, 4-chloro-1,3-phenylene, 2-chloro-1,4-phenylene, 5-carboxamido-1,3-phenylene, 1,4-phenylene-2-sulphonic acid, 1,3-phenylene-4-sulphonic acid, 1,3-phenylene-5-carboxylic acid, 1,3-phenylene-4-carboxylic acid. Examples of alkylene radicals are:

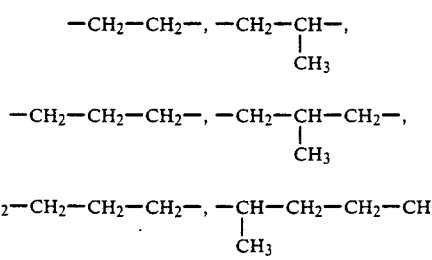

Suitable radicals $R_3$ and $R_4$ besides H are in particular those mentioned for $R_1$ and $R_2$ and optionally sulpho or carboxyl-substituted phenyl.

Preferred dyes I are those where $R_1$-$R_4$ = H,

B = phenylene, optionally substituted by $C_1$-$C_4$-alkyl, $C_1$-$C_4$-alkoxy, halogen or $C_2$-$C_4$-alkylene, a = 1.8 to 2.7, b = 0.8 to 1.2, c = 0.5 to 1.1.

Preferred dyes I are in addition those where $R_1$-$R_4$ = H,

B = sulpho- or carboxy-phenylene, optionally further substituted by $C_1$-$C_4$-alkyl, $C_1$-$C_4$-alkoxy, halogen (Cl), a = 1.8 to 2.7, b = 0.8 to 1.2, c = 0.5 to 1.1.

Further preferred dyes I are those where $R_1$-$R_4$ = H

B = phenylene, optionally substituted by $C_1$-$C_4$-alkyl, $C_1$-$C_4$-alkoxy, halogen (Cl) or $C_2$-$C_5$-alkylene, preferably phenylene, a = 1.8 to 2.7, b = 0.8 to 1.0, c = 0.5 to 1.0.

Preference is further given to dyes I where $R_1$-$R_3$ = H $R_4$ = an aliphatic or aromatic radical which contains a water-solubilizing group (preferably SO$_3$H, COOH, OH), B = phenylene, optionally substituted by SO$_3$H, COOH, $C_1$-$C_4$-alkyl, $C_1$-$C_4$-alkoxy, halogen or $C_2$-$C_4$-alkylene.

The indicated formulae are those of the free acids. In general, the salts produced by customary preparation, in particular the alkali metal or ammonium salts, are used.

The dyes I are prepared for example by reacting a phthalocyaninesulphonyl chloride of the formula

wherein

Pc = radical of a Cu- or Ni-phthalocyanine, q = 0.6 to 2.0 and p = 1.5 to 3.4 with 0.8 to 1.2 moles of an amine of the formula

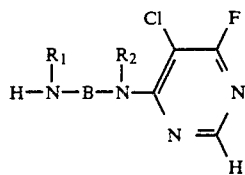

and 0.5 to 1.5 moles of an amine of the formula

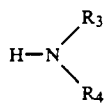

where

B, $R_1$, $R_2$, $R_3$ and $R_4$ have the meaning indicated for the formula (I) and then hydrolyzing any sulphonyl chloride groups still present.

Amines of the formula (III) are easily preparable by single-sided reaction of the corresponding diamine with 4,6-dichloro-5-chloropyrimidine of the formula

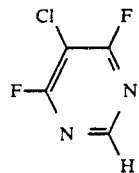

at 20° to 35° C. in aqueous suspension.

Another way of preparing the aforementioned dyestuffs comprises first reacting the phthalocyanine sulphonyl chloride of the formula (II) with 0.8 to 1.2 moles of an amine of the formula

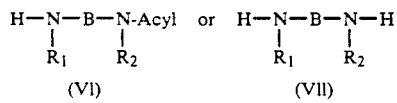

and 0.5 to 1.5 moles of an amine of the formula

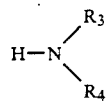

where

B, $R_1$, $R_2$, $R_3$ and $R_4$ have the meaning indicated for the formula (I), hydrolyzing the acylamino group, if present, and reacting the resulting dyebase with 0.8 to 1.2 moles of 4,6-difluoro-5-chloropyrimidine of the formula

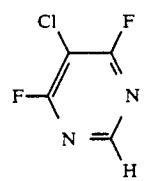

The phthalocyaninesulphonyl chlorides of the formula (II) are prepared by treating Cu-phthalocyanine or Ni-phthalocyanine in chlorosulphonic acid at 135° to 140° C.

Examples of amines of the formula (III) are:
4-(3-aminophenyl)amino-5-chloro-6-fluoropyrimidine,
4-(4-aminophenyl)amino-5-chloro-6-fluoropyrimidine,
4-(2-aminophenyl)amino-5-chloro-6-fluoropyrimidine,
4-(4-methylaminophenyl)amino-5-chloro-6-fluoropyrimidine,
4-(3-amino-4-methylphenyl)amino-5-chloro-6-fluoropyrimidine,
4-(4-amino-3-chlorophenyl)amino-5-chloro-6-fluoropyrimidine,
4-(3-aminophenyl-4-sulpho)amino-5-chloro-6-fluoropyrimidine,
4-(3-amino-4-carboxyphenyl)amino-5-chloro-6-fluoropyrimidine,
4-(4-aminophenyl)methylamino-5-chloro-6-fluoropyrimidine,
4-(2-aminoethyl)amino-5-chloro-6-fluoropyrimidine,
4-(2-methylaminoethyl)methylamino-5-chloro-6fluoropyrimidine.

Examples of amines of the formula (IV) are: ammonia, methylamine, ethylamine, hydroxyethylamine, aminoacetic acid, aminoethanesulphonic acid, methylaminoethanesulphonic acid, aminomethanesulphonic acid, ethanolaminosulphuric ester.

Examples of amines of the formula (VI) are: 4-aminoformanilide, 3-aminoformanilide, 2-aminoacetanilide, 3-aminoacetanilide, 4-aminoacetanilide, 3-aminophenyloxamidic acid, 4-aminophenyloxamidic acid, N-(3-aminophenyl)-2-hydroxyacetamide, N-(4-aminophenyl)-N-methylacetamide, N-(4-aminophenyl)-N-methylformamide, N-(4-aminophenyl)-N-ethylacetamide, N-(4-amino-2,5-dichlorophenyl)-acetamide, N-(4-amino-3-nitrophenyl)-acetamide, N-(5-amino-2-methylphenyl)-formamide, N-(5-amino-2-methylphenyl)-acetamide, N-(3-amino-2-methylphenyl)acetamide, N-(3-amino-4-methylphenyl)-N-ethylacetamide, N-(4-amino-3-methylphenyl)-acetamide, N-(2-amino-4-methylphenyl)-acetamide, 4-(acetylamino)-2-aminobenzoic acid, 5-(acetylamino)-2-aminobenzoic acid.

Examples of amines of the formula (VII) are: 1,3-diaminobenzene-4-sulphonic acid, 1,4-diaminobenzene-2-sulphonic acid, 1,3-diaminobenzene-4-carboxylic acid, 1,4-diaminobenzene-2-carboxylic acid, 2-chloro-1,4-phenylenediamine, 2-nitro-1,4-phenylenediamine.

The reaction between the phthalocyaninesulphonyl chlorides of formula (II) and the amines of the formulae (III), (IV), (VI) and (VII) preferably takes place in an aqueous solution or suspension at temperatures of 0° to 30° C. and pH values of 6 to 10. The hydrolysis of the acylamino group after (II) has been reacted with (VI) can be carried out not only in an acid medium but also in an alkali medium, preferably at temperatures of between 70° to 80°.

The reaction of the dye base with the difluorochloropyrimidine of the formula (V) is carried out in aqueous solution at pH 6 to 7 and 20° to 35° C.

If a phthalocyaninesulphonyl chloride of the formula (II) is reacted with an amine of the formula (III), it is not necessary to start from isolated amine (III). On the contrary, the suspension of (III) obtained from the single-sided reaction of diamine with 4,6-difluoro-5-chloropyrimidine can be used for the reaction with the phthalocyaninesulphonyl chloride.

The novel dyestuffs are highly suitable for dyeing and printing hydroxyl- and amido-containing textile materials, for example those made of cellulose, wool or synthetic polyamides. They are applied in a conventional manner.

In the Examples which follow, parts are by weight and the degrees are degrees Celsius.

EXAMPLE 1

59.4 parts of 97% pure copper phthalocyanine are stirred in 234 parts of chlorosulphonic acid at 136° to 138° for 8 hours. The melt is cooled down to 25° and—optionally after it has been diluted with a little chlorosulphonic acid—is discharged onto ice, during which step the temperature should not exceed +3°. The suspension is filtered with suction, and the filter cake is washed with 1600 parts of ice-water, admixed with 75 parts of 30% strength hydrochloric acid.

The filter cake is mixed with 1000 parts of ice-water by stirring for 15 minutes. 5.5 parts of ammonium chloride and 23.75 parts of 4-fluoro-5-chloro-6-(3-aminophenyl)aminopyrimidine are then stirred in. By addition of sodium hydroxide solution the pH value of the suspension or solution is brought to 10.0 in the course of 2 hours while at the same time the temperature is raised to 23°. Stirring is then continued at pH 10 and 20° to 24° until the reaction has ended. The dyestuff is salted out, briefly stirred at pH 7, filtered off with suction and repeatedly washed with dilute NaCl solution. The dyestuff is dried at 60°. It conforms in the form of its free acid essentially to the formula

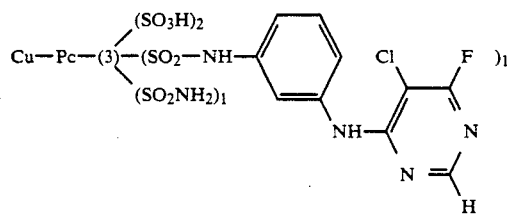

and dyes cotton, for example by the exhaust method, in bright, extremely wash- and light-fast turquoise shades, the most suitable dye temperature being 80°.

The 4-fluoro-5-chloro-6-(3-aminophenyl)aminopyrimidine mentioned in paragraph 2 is obtained by subjecting an aqueous solution of 1 mole of 1,3-phenylene diamine with thorough stirring at 20° to 35° and at a pH of 6 to 7 to the action of 1 mole of 4,6-difluoro-5-chloropyrimidine.

EXAMPLE 2

59.4 parts of 97% pure copper phthalocyanine are stirred in 190 parts of chlorosulphonic acid at 136° to 138° for 8 hours. The melt is cooled down to 25° and—optionally after it has been diluted with a little chlorosulphonic acid—is discharged onto ice, during which step the temperature should not exceed +3°. The suspension is filtered with suction, and the filter cake is washed with 1600 parts of ice-water, admixed with 70 parts of 30% strength hydrochloric acid.

The filter cake is mixed with 1000 parts of ice-water by stirring for 15 minutes. 5.5 parts of ammonium chloride and 20 parts of 4-fluoro-5-chloro-6-(3-aminophenyl)aminopyrimidine are then stirred in. By addition of sodium hydroxide solution the pH value of the suspension or solution is brought to 9.0 in the course of 90 minutes and at the same time the temperature is raised to 20°. Stirring is continued at pH 9.0 and at 20° to 24° for 5 hours, 5 ml of pyridine are added, and pH 9 is maintained for a further 2 hours. The dyestuff is then salted out, the suspension is subsequently briefly stirred at pH 7, and the suspended solids are filtered off with suction and washed repeatedly with dilute NaCl solution. The dyestuff is then dried at 60° in a circulating air cabinet.

The dyestuff conforms in the form of its free acid to the formula

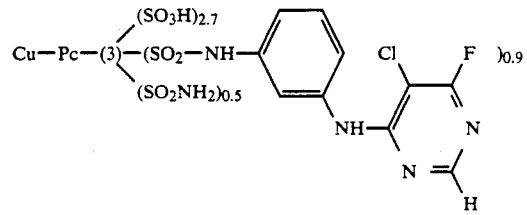

It is very readily soluble and dyes cotton in bright extremely wash- and light-fast turquoise shades, the most suitable dyeing temperature being 80°.

EXAMPLE 3

59.4 parts of 97% pure copper phthalocyanine are stirred in 298 parts of chlorosulphonic acid at 136° to 138° for 8 hours. The melt is cooled down to 25° and—optionally after it has been diluted with a little chlorosulphonic acid—is discharged onto ice, during which step the temperature should not exceed +3°. The suspension is filtered with suction, and the filter cake is washed with 1600 parts of ice-water, admixed with 70 parts of 30% strength hydrochloric acid.

The filter cake is mixed with 1000 parts of ice-water by stirring for 15 minutes. An aqueous solution containing 14.7 parts of sodium 2-aminoethylsulphonate is then stirred in, followed by 25 parts of 4-fluoro-5-chloro-6-(3-aminophenyl)aminopyrimidine. By means of dilute sodium hydroxide solution the pH value of the suspension or solution is brought to 9.0 in the course of 120 minutes and at the same time the temperature is raised to 24°. Stirring is continued at pH 9.0 for 5 hours, 5 ml of pyridine are added to complete the hydrolysis of the remaining sulphonyl chloride groups, and stirring is continued at pH 9.0 for a further 2 hours. The resulting dyestuff is salted out, briefly stirred at pH 7.0, filtered off with suction and washed briefly with dilute NaCl solution. The dyestuff is dried at 60° in a circulating air cabinet. The dyestuff conforms in the form of its free acid to the formula

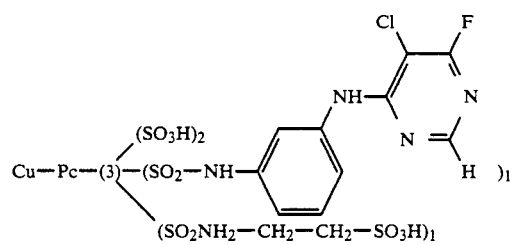

is readily soluble and dyes cotton in bright, extremely wash- and light-fast turquoise shades, the most suitable dyeing temperature being 80°.

If the above procedure is repeated, except that the 14.7 parts of sodium 2-aminoethanesulphonate mentioned in paragraph 2 are replaced by 8 parts of aminoacetic acid or 14.1 parts of ethanolaminesulphuric ester, this likewise gives dyestuffs which are very readily soluble and dye cotton in bright turquoise shades of very good wash- and light-fastness.

EXAMPLE 4

59.4 parts of 97% pure copper phthalocyanine are stirred in 234 parts of chlorosulphonic acid at 136° to 138° for 8 hours. The melt is cooled down to 25° and—optionally after it has been diluted with a little chlorosulphonic acid—is discharged onto ice, during which step the temperature should not exceed +3°. The suspension is filtered with suction, and the filter cake is washed with 1600 parts of ice-water, admixed with 75 parts of 30% strength hydrochloric acid.

The filter cake is mixed with 1000 parts of ice-water by stirring for 15 minutes. 5.5 parts of ammonium chloride and 23.75 parts of 4-fluoro-5-chloro-6-(3-aminophenyl)aminopyrimidine are then stirred in. By addition of sodium hydroxide solution the pH value of the suspension or solution is brought to 10.0 in the course of 2 hours while at the same time the temperature is raised to 23°. Stirring is then continued at pH 10 and 20° to 24° until the reaction has ended. The dyestuff is salted out, briefly stirred at pH 7, filtered off with suction and repeatedly washed with dilute NaCl solution. The dyestuff is dried at 60°. It conforms in the form of its free acid to the formula

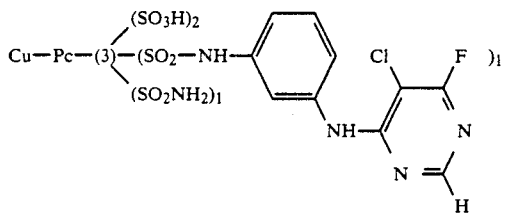

The dyestuff dyes cotton in bright, extremely wash- and light-fast turquoise shades, the most suitable dyeing temperature being 80°.

Dyestuffs having similar properties are obtained on replacing the 23.75 parts of 4-fluoro-5-chloro-6-(4-aminophenyl)aminopyrimidine mentioned in paragraph 2 by 25.3 parts of 4-fluoro-5-chloro-6-(4-aminophenyl)-methylaminopyrimidine or by 25.3 parts of 4-fluoro-5-chloro-6-(3-amino-4-methylphenyl)aminopyrimidine or by 27.3 parts of 4-fluoro-5-chloro-6-(3-chloro-4-aminophenyl)aminopyrimidine.

If the procedure described in paragraphs 2 and 3 is followed, except that only 2.7 parts of ammonium chloride are used, this gives turquoise dyestuffs which, having similar dyeing properties but improved solubility, dye cotton in turquoise shades of very good wash and light fastness.

The pyrimidine derivatives mentioned in this example are prepared from the corresponding diamines by reaction with 4,6-difluoro-5-chloropyrimidine as described in the last paragraph of Example 1.

EXAMPLE 5

59.4 parts of 97% pure copper phthalocyanine are stirred in 234 parts of chlorosulphonic acid at 136° to 138° for 8 hours. The melt is cooled down to 25° and—optionally after it has been diluted with a little chlorosulphonic acid—is discharged onto ice, during which step the temperature should not exceed +3°. The suspension is filtered with suction, and the filter cake is washed with 1600 parts of ice-water, admixed with 75 parts of 30% strength hydrochloric acid.

The filter cake is mixed with 300 parts of water and 200 parts of ice by stirring at 0° to 30° for 15 minutes. 2.7 parts of ammonium chloride and 29.2 parts of 3-aminoacetanilide hydrochloride (51.6% strength) are then added. By addition of sodium hydroxide solution, the pH is brought to 10.0 in the course of 2 hours and the temperature is raised at the same time to 24°. Stirring is then continued at 22° to 25° and pH 9.8 to 10.0 until the reaction has ended. The temperature is raised to 65° to 68°, 276 parts of sodium hydroxide solution (30% strength) are added in the course of 5 minutes, and stirring is continued at 72° for 6 hours to hydrolyze the acetylamino group. To isolate the dye base, 380 parts of hydrochloric acid (30% strength) are added in the course of 15 minutes, the mixture is briefly stirred at 60°, and the solid is filtered off with suction and repeatedly washed with a mixture of 270 parts of water and 35 parts of hydrochloric acid (30% strength).

The filter cake of paragraph 2 is dissolved by means of sodium hydroxide solution in 1500 parts of water and at a pH of 7.0 to 7.5. 16.5 parts of 4,6-difluoro-5-chloropyrimidine are added with thorough stirring at pH 6.5 to 7.0 in the course of 5 minutes. The temperature is gradually increased to 40° while the pH value of 6.5 to 7.0 is maintained by addition of sodium hydroxide solution. After the reaction has ended, the dyestuff is salted out, filtered off with suction, briefly washed with dilute sodium chloride solution and dried at 60°. The dyestuff conforms in the form of its free sulphonic acid to the formula

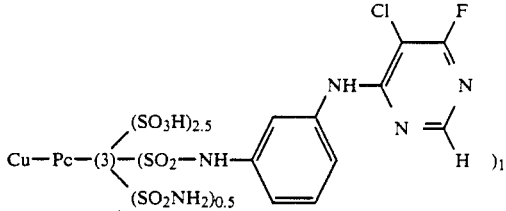

It dyes cotton in bright, extremely wash- and light-fast turquoise shades, the most suitable dyeing temperature being 80°.

EXAMPLE 6

59.4 parts of 97% pure copper phthalocyanine are stirred in 298 parts of chlorosulphonic acid at 136° to 138° for 8 hours. The melt is cooled down to 25° and—optionally after it has been diluted with a little chlorosulphonic acid—is discharged onto ice, during which step the temperature should not exceed +3°. The suspension is filtered with suction, and the filter cake is washed with 1600 parts of ice-water, admixed with 70 parts of 30% strength hydrochloric acid.

The filter cake is mixed with 300 parts of water and 200 parts of ice by stirring at 0° to 3° for 15 minutes. 5.4 parts of ammonium chloride and 15 g of 3-aminoacetanilide hydrochloride (100% strength) are then added. By addition of sodium hydroxide solution the pH value is brought to 10.0 in the course of 2 hours and the temperature is raised at the same time to 24°. Stirring is continued at 22° to 24° and pH 9.8 to 10.0 until the reaction has ended. The temperature is raised to 65°-68°, and 276 parts of sodium hydroxide solution (30% strength) are added in the course of 5 minutes, and stirring is continued at 72° for 6 hours to hydrolyze the acetylamino group. To isolate the dye base, 380 parts of hydrochloric acid (30° strength) are added in the course of 15 minutes, the mixture is subsequently briefly stirred at 60°, and the solids are filtered off with suction and washed repeatedly with a mixture of 270 parts of water and 35 parts of hydrochloric acid (30% strength).

The filter cake of paragraph 2 is dissolved by means of sodium hydroxide solution in 1500 parts of water at pH 7.0 to 7.5. 16.5 parts of 4,6-difluoro-5-chloropyrimidine are added with thorough stirring at pH 6.5 to 7.0 in the course of 5 minutes. The temperature is gradually raised to 40° while a pH value of 6.5 to 7.0 is maintained by addition of sodium hydroxide solution. After the reaction has ended, the dyestuff is salted out, filtered off with suction, briefly washed with dilute sodium chloride solution and dried at 60°. The dyestuff conforms in the form of its free sulphonic acid to the formula

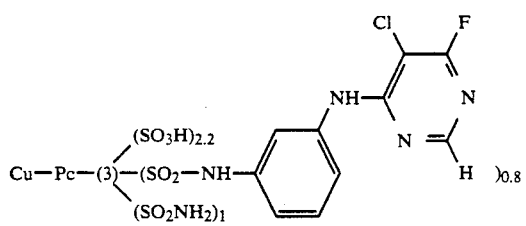

The dyestuff is readily to very readily soluble and dyes cotton in wash- and light-fast turquoise shades, the most suitable dyeing temperature being 80°.

EXAMPLE 7

59.4 parts of 97% pure copper phthalocyanine are stirred in 298 parts of chlorosulphonic acid at 136° to 138° for 8 hours. The melt is cooled down to 25° and—optionally after it has been diluted with a little chlorosulphonic acid—is discharged onto ice, during which step the temperature should not exceed +30°. The suspension is filtered with suction, and the filter cake is washed with 1600 parts of ice-water, admixed with 70 parts of 30% strength hydrochloric acid.

The filter cake is mixed with 300 parts of water and 200 parts of ice by stirring at 0° to 3° for 15 minutes. 5.4 parts of ammonium chloride and 10.2 parts of monoacetylethylenediamine are then added. The pH value is raised to pH to 10 in the course of 2 hours while at the same time the temperature is raised to 25°. Stirring is continued at 25° and pH 9.8 to 10 until the reaction has ended. The temperature is raised to 65°-68°, and 276 parts of sodium hydroxide solution (30% strength) are added in the course of 5 minutes. To hydrolyze the acetylamino group, stirring is continued at 72° for 6 hours. The dye base is isolated by addition of 380 parts of hydrochloric acid (30% strength), filtering off with suction and washing the filter cake with a 10:1 mixture of water/30% strength hydrochloric acid.

The filter cake of paragraph 2 is dissolved by means of sodium hydroxide solution in 1500 parts of water at pH 8 to 8.5. 16.5 parts of 4,6-difluoro-5-chloropyrimidine are added with thorough stirring in the course of 15 minutes while a pH value of 8.0 to 8.5 is maintained by addition of sodium hydroxide solution. While this pH is maintained, the temperature is gradually raised to 40°, and stirring is continued until the reaction has ended. The dyestuff is then salted out, filtered off with suction, briefly washed with dilute sodium chloride solution and dried at 60°. The dyestuff conforms in the form of its free sulphonic acid to the formula

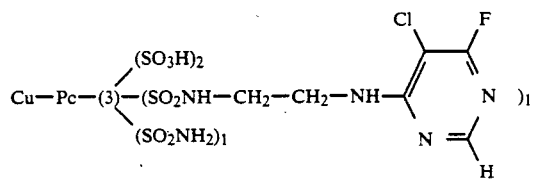

It dyes cotton in bright, extremely wash- and light-fast turquoise shades, the most suitable dyeing temperature being 80°.

EXAMPLE 8

57.5 parts of 99% pure nickel phthalocyanine are stirred in 257 parts of chlorosulphonic acid at 136° to 138° for 8 hours. The melt is cooled down to 25° and—optionally after it has been diluted with a little chlorosulphonic acid—is discharged onto ice, during which step the temperature should not exceed +3°. The suspension is filtered with suction, and the filter cake is washed with 1600 parts of ice-water, admixed with 150 parts of 30% strength hydrochloric acid.

The filter cake is mixed with 1000 parts of ice-water by stirring for 15 minutes. 2.7 parts of ammonium chloride and 22 parts of 4-fluoro-5-chloro-6-(3-aminophenyl)aminopyrimidine are then stirred in. By addition of sodium hydroxide solution the pH value of the suspension or solution is brought to 10.0 in the course of 2 hours while at the same time the temperature is raised to 23°. Stirring is then continued at pH 10 and 20° to 24° until the reaction has ended. The dyestuff is salted out, briefly stirred at pH 7, filtered off with suction and repeatedly washed with dilute NaCl solution. The dyestuff is dried at 60°. It conforms in the form of its free acid to the formula

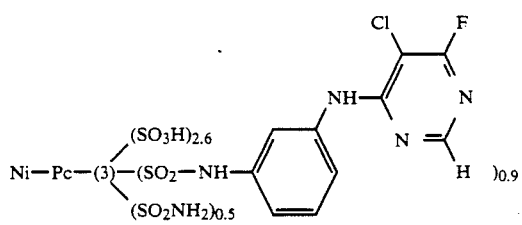

The dyestuff dyes cotton in extremely wash- and light-fast bluish green shades, the most suitable dyeing temperature being 80°.

Dyestuffs having similar properties are obtained on replacing the 22 parts of 4-fluoro-5-chloro-6-(3-aminophenyl)aminopyrimidine mentioned in paragraph 2 by 22.8 parts of 4-fluoro-5-chloro-6-(4-aminophenyl)methylaminopyrimidine or by 22 parts of 4-fluoro-5-chloro-6-(4-aminophenyl)aminopyrimidine or by 22.8 parts of 4-fluoro-5-chloro-6-(3-amino-4-methylphenyl)aminopyrimidine or by 24.6 parts of 4-fluoro-5-chloro-6-(3-chloro-4-aminophenyl)aminopyrimidine.

EXAMPLE 9

57.5 parts of 99% pure nickel phthalocyanine are stirred in 257 parts of chlorosulphonic acid at 136° to 138° for 8 hours. The melt is cooled down to 25° and—optionally after it has been diluted with a little chlorosulphonic acid—is discharged onto ice, during which step the temperature should not exceed +3°. The suspension is filtered with suction, and the filter cake is washed with 1600 parts of ice-water, admixed with 150 parts of 30% strength hydrochloric acid.

The filter cake is suspended in 1000 parts of water by stirring for 15 minutes. 12.5 parts of aminoethanesulphonic acid (in the form of an aqueous solution of an Na salt) are then added, followed by 23.8 parts of 4-fluoro-5-chloro-6-(3-aminophenyl)aminopyrimidine. By addition of sodium hydroxide solution the pH value of the suspension or solution is brought to 10.0 in the course of 2 hours and at the same time the temperature is raised to 23°. Stirring is continued at pH 10 and 20° to 24° until the reaction has ended. The dyestuff is salted out, briefly stirred at pH 7.0, filtered off with suction and repeatedly washed with dilute NaCl solution. The dyestuff is dried at 60°. It conforms in the form of its free acid formally to the formula

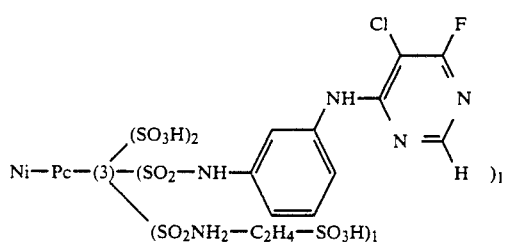

The dyestuff dyes cotton in extremely wash- and light-fast bluish green shades, the most suitable dyeing temperature being 80°.

Dyestuffs having similar properties are obtained on replacing the 12.5 parts of aminoethanesulphonic acid mentioned in paragraph 2 by 6.5 parts of aminoacetic acid, by 11.1 parts of aminoethanesulphonic acid, by 14.1 parts or 7.1 parts of aminoethanesulphuric ester or by 12.3 parts of aminoethanesulphonic acid and otherwise proceeding as described in paragraph 2.

EXAMPLE 10

59.4 parts of 97% pure copper phthalocyanine are stirred in 298 parts of chlorosulphonic acid at 136° to 138° for 8 hours. After cooling down to 25°, the suspension is discharged onto ice, for which step the temperature should not exceed +3°. The suspension is filtered with suction, and the filter cake is washed with 1600 parts of ice-water to which 70 parts of 30% strength hydrochloric acid have been added.

The filter cake is suspended in 1000 parts of ice-water by stirring for 15 minutes. 26.3 parts of 4-fluoro-5-chloro-6-(3-aminophenyl)aminopyrimidine and 12.2 g of aminomethanesulphonic acid are then added, the mixture is subsequently stirred for 15 minutes, and it is then brought to pH 6.5 with dilute sodium hydroxide solution. The mixture is then maintained at 0° to 5° and pH 6.5 for 3 hours, then brought to pH 9.5–10.0 and after 2 hours warmed to 20°–25°. After 15 hours at 20° to 25°, the mixture is brought to pH 7, and the dyestuff is salted out with sodium chloride, filtered off with suction and washed with sodium chloride solution. The dyestuff obtained on drying conforms in the form of its free acid essentially to the formula

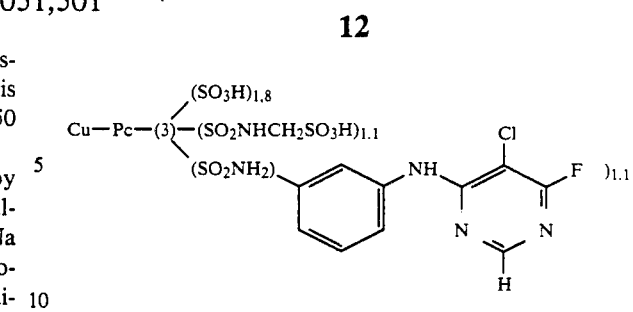

and dyes cotton by the exhaust method in bright wash- and light-fast turquoise shades.

EXAMPLE 11

59.4 parts of 97% pure copper phthalocyanine are stirred in 310 parts of chlorosulphonic acid at 136° to 138° for 8 hours, 35 parts of thionyl chloride are added and the mixture is stirred at 90° to 92° for a further 4 hours. The melt is discharged onto ice, for which step the temperature should not exceed +3°. After filtering off with suction, the filter residue is washed with 1600 parts of ice-water made acid with hydrochloric acid.

The filter cake is then suspended in 1000 parts of ice-water. 55 pats of 4-fluoro-5-chloro-6-(3-amino-4-sulphophenyl)aminopyrimidine and 5.9 parts of ammonium chloride are then stirred in. At 0° to 5° the pH is brought to 6.0 to 6.5 and maintained with dilute sodium hydroxide solution for 3 hours. The pH is then brought to 9.5–10, and 2 hours later the melt is warmed to room temperature. After about 15 hours at 20° to 25°, the pH is brought to 7, and the dyestuff is salted out with sodium chloride, filtered off with suction, washed with sodium chloride solution and dried at 60° in vacuo. The dyestuff conforms in the form of its free acid essentially to the formula

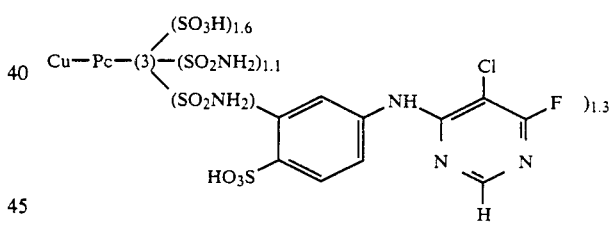

and dyes cotton by printing in bright turquoise shades. 4-Fluoro-5-chloro-6-(3-amino-4-sulphophenyl)aminopyrimidine is obtained by reacting 1 mole of 2,4-diaminobenzenesulphonic acid with 1 mole of 4,6-difluoro-5-chloropyrimidine in water at room temperature.

We claim:
1. A reactive dyestuff of the formula

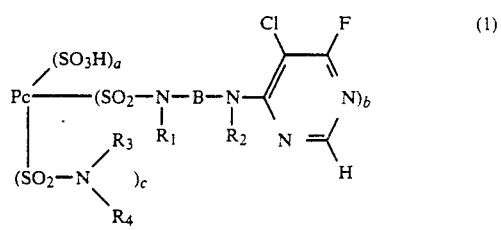

wherein
Pc=radical of a Cu-phthalocyanine,
$R_1$, $R_2$=H or $C_1$-$C_4$-alkyl

B=phenylene
R$_3$, R$_4$=H, C$_1$-C$_4$-alkyl or together C$_2$-alkylene,
a=1.0 to 2.7,
b=0.8 to 1.2, and
c=0.5 to 1.5, where a+b+c=3 to 4.
2. A dyestuff according to claim 1, wherein
R$_1$-R$_4$=H,
B=phenylene,
a=1.8 to 2.7,
b=0.8 to 1.2, and
c=0.5 to 1.1.
3. A dyestuff according to claim 1, wherein
R$_1$-R$_4$=H,
a=1.8 to 2.7,
b=0.8 to 1.0,
c=0.5 to 1.0.
4. A dyestuff according to claim 1, of the formula
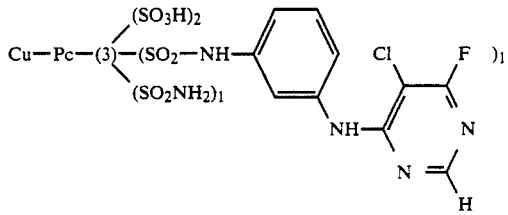
* * * * *

UNITED STATES PATENT AND TRADEMARK OFFICE
CERTIFICATE OF CORRECTION

PATENT NO. : 5,051,501

DATED : September 24, 1991

INVENTOR(S) : Schundehutte et al.

It is certified that error appears in the above-identified patent and that said Letters Patent is hereby corrected as shown below:

Title Page          ABSTRACT: Line 1 delete " Novel reactive " and substitute -- Reactive --

Col. 7, line 30    Delete " 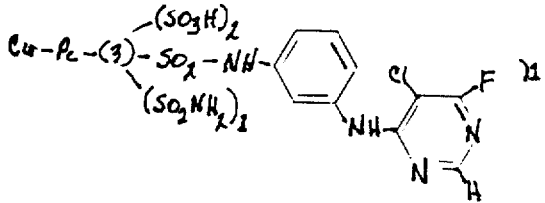 " and substitute -- 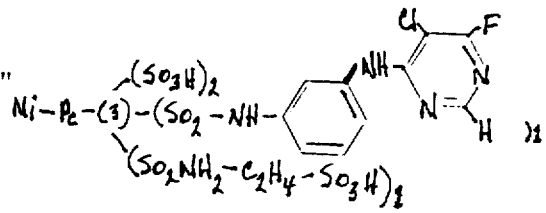 --

Col. 11, line 25    Delete " 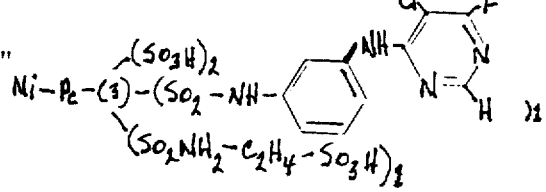 " and sub-

UNITED STATES PATENT AND TRADEMARK OFFICE
CERTIFICATE OF CORRECTION

PATENT NO. : 5,051,501

DATED : September 24, 1991

INVENTOR(S) : Schundehutte et al.

It is certified that error appears in the above-identified patent and that said Letters Patent is hereby corrected as shown below:

stitute -- 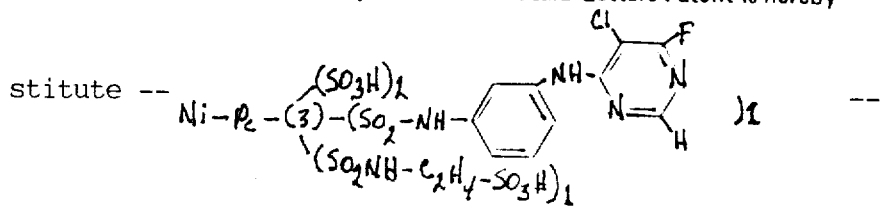 --

Signed and Sealed this

Twenty-seventh Day of April, 1993

Attest:

MICHAEL K. KIRK

*Attesting Officer*     *Acting Commissioner of Patents and Trademarks*